(Model.)

W. E. STANTON.
Lawn Mower.

No. 236,854.  Patented Jan. 18, 1881.

WITNESSES:
Francis McArdle
C. Sedgwick

INVENTOR:
W. E. Stanton
BY Munn & Co
ATTORNEYS.

UNITED STATES PATENT OFFICE.

WILLIAM E. STANTON, OF RIDGEVILLE, OHIO.

LAWN-MOWER.

SPECIFICATION forming part of Letters Patent No. 236,854, dated January 18, 1881.

Application filed July 21, 1880. (Model.)

*To all whom it may concern:*

Be it known that I, WILLIAM E. STANTON, of Ridgeville, in the county of Warren and State of Ohio, have invented a new and useful Improvement in Lawn-Mowers, of which the following is a specification.

Figure 1:
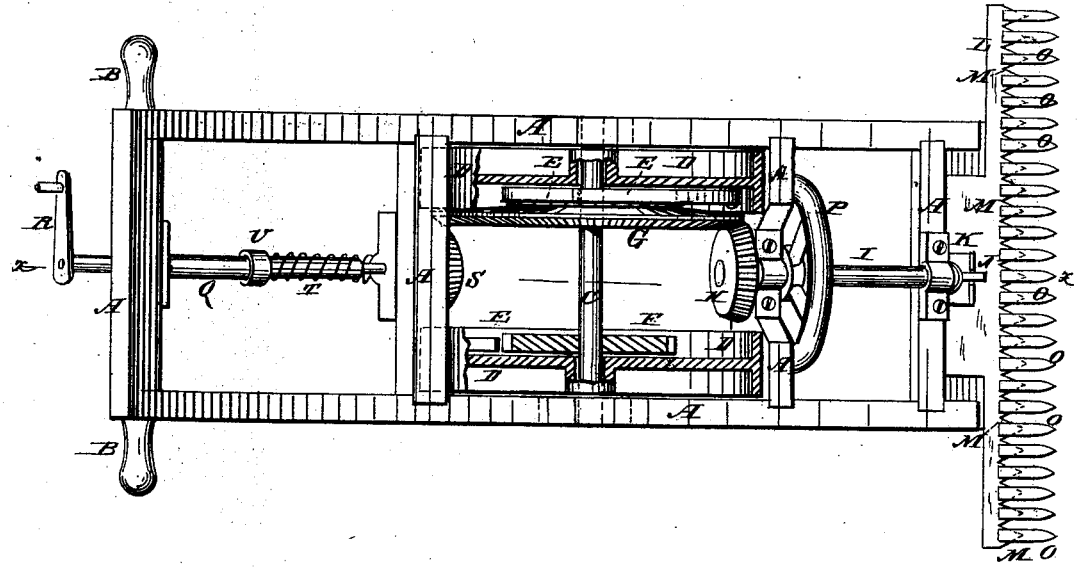
Figure 2:
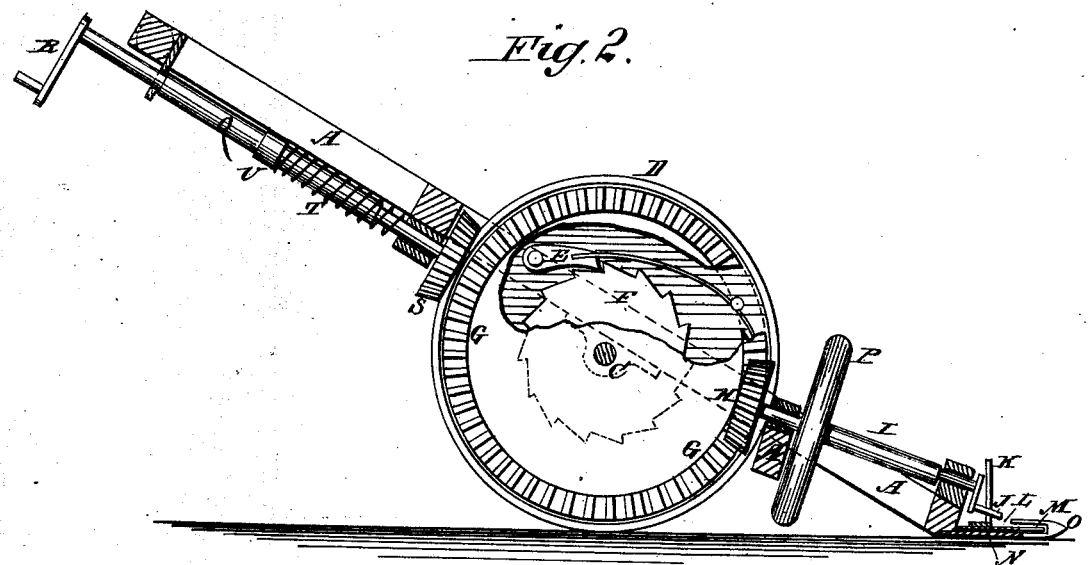

Figure 1 is a plan view of the improvement, partly in section. Fig. 2 is a sectional side elevation taken through the line $x\ x$, Fig. 1.

The object of this invention is to furnish lawn-mowers to which an initial movement can be given, so that they will work with as much power when starting as after they are fully in motion.

Similar letters of reference indicate corresponding parts.

The frame A of the machine is made long and narrow, and is formed of two side bars connected by four cross-bars.

Upon the ends of the rear cross-bar of the frame A are formed, or to the rear corners of the said frame are attached, handles B.

In bearings attached to the middle parts of the side bars of the frame A revolves a shaft, C, upon which, at the inner sides of the said side bars, are placed loose drive-wheels D.

To the inner sides of the drive-wheels D are attached spring-pawls E, which engage with the teeth of the ratchet-wheels F, attached to the shaft C at the inner sides of the drive-wheels D, so that the said drive-wheels, when turned forward, will carry the shaft C with them, but can be turned back without turning the said shaft.

To the shaft C, at the inner side of one of the ratchet-wheels F, is attached a large beveled-gear wheel, G, into the teeth of which mesh the teeth of a small beveled gear-wheel, H, attached to the rear end of the shaft I. The shaft I revolves in bearings attached to the two forward cross-bars of the frame A, and to its forward end is attached, or upon it is formed, a small crank, J, the crank-pin of which enters a vertical slot formed in the arm K, attached to the sickle-bar L or to a flange formed upon or attached to the rear middle part of the said sickle-bar L, so that the sickle-bar L will be vibrated by the revolution of the shaft I. The sickle-bar L is provided with sickles M and works upon the upper side of the finger-bar N. The finger-bar N is provided with guard-fingers O, through slots in which the sickles M vibrate, so that the said sickles will cut the grass against the sides of the said guard-fingers O.

To the rear middle part of the finger-bar N is attached, or upon it is formed, a flange, which is attached to the beveled lower side of the forward end of the frame A.

With this construction the machine will be operated by the revolution of the drive-wheels D as the said machine is pushed forward.

To the rear part of the shaft I is attached a balance-wheel, P, to give momentum and steadiness of motion to the sickle-bar as the resistance of the grass varies.

The sickle-bar L is made of a length equal to the greatest width of the machine, to adapt the mower to cut close to borders and fences and in corners, as may be required.

In bearings attached to the two rear cross-bars of the frame A revolves and slides a shaft, Q, the rear end of which projects in the rear of the rear cross-bar of the frame A, and has a small crank, R, attached to it.

To the forward end of the shaft Q is attached a small beveled-gear wheel, S, the teeth of which, when the shaft Q is pushed forward, mesh into the teeth of the large beveled-gear wheel G, so that an initial motion may be given to the shaft I, to give momentum to the balance-wheel P as or before the machine is started forward, to cause the machine to begin its advance with sufficient power to cut the grass.

When the forward pressure upon the shaft Q is withdrawn the small gear-wheel S is thrown out of gear with the large gear-wheel G by a spring, T, coiled around or otherwise connected with the shaft Q. The rear end of the spring T rests against a shoulder or collar, U, formed upon or attached to the shaft Q, and its forward end rests against the forward bearings for the said shaft Q.

Having thus fully described my invention, I claim as new and desire to secure by Letters Patent—

In a lawn-mower, the combination, with the beveled-gear wheel G attached to the driving-shaft, of the beveled-gear wheel S, the shaft Q, the crank R, and the spring T, substantially as herein shown and described, whereby an initial motion and momentum can be given to the sickle-bar when starting, as set forth.

WILLIAM EDWARD STANTON.

Witnesses:
N. E. LUPTON,
C. A. HOUGH.